UNITED STATES PATENT OFFICE.

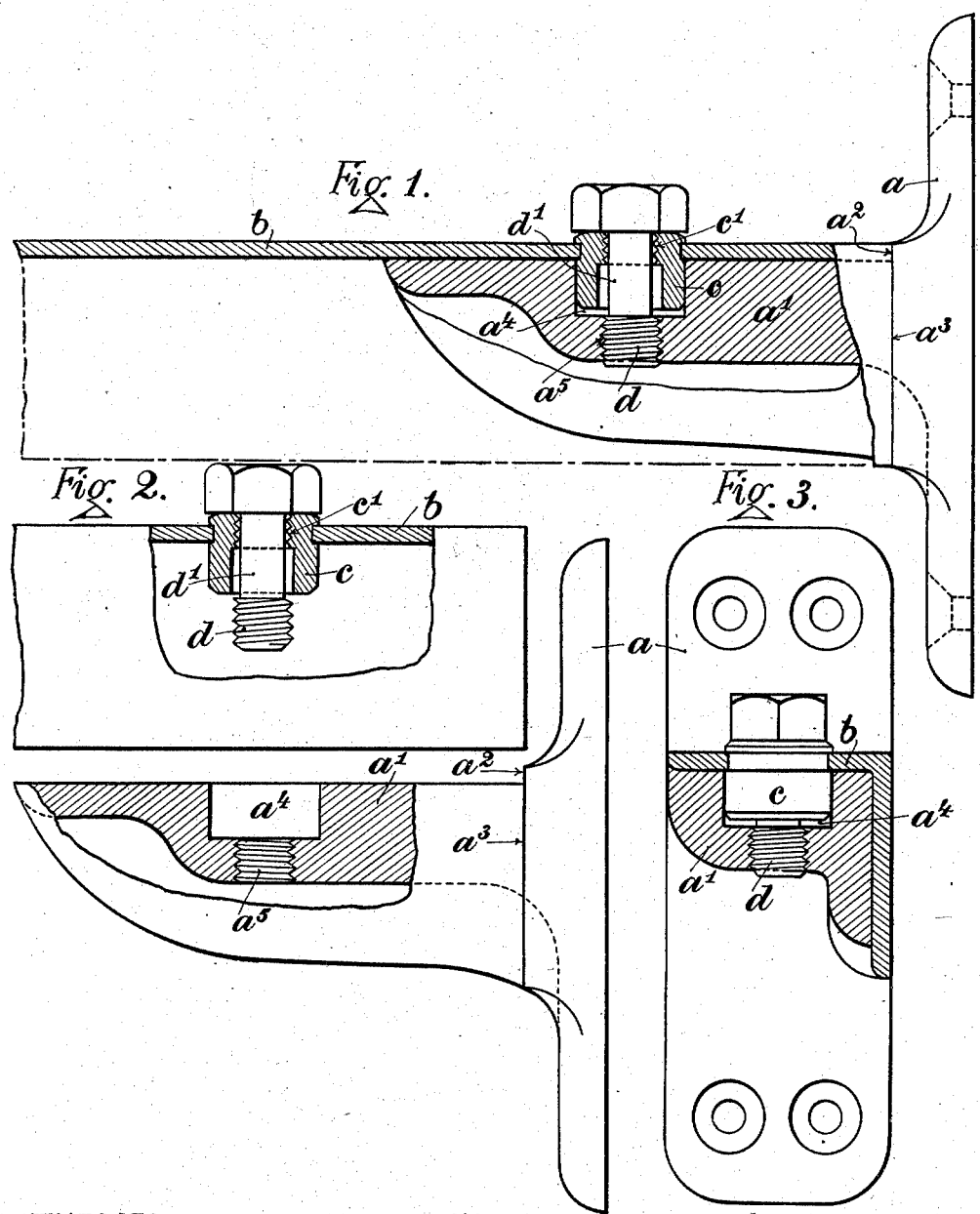

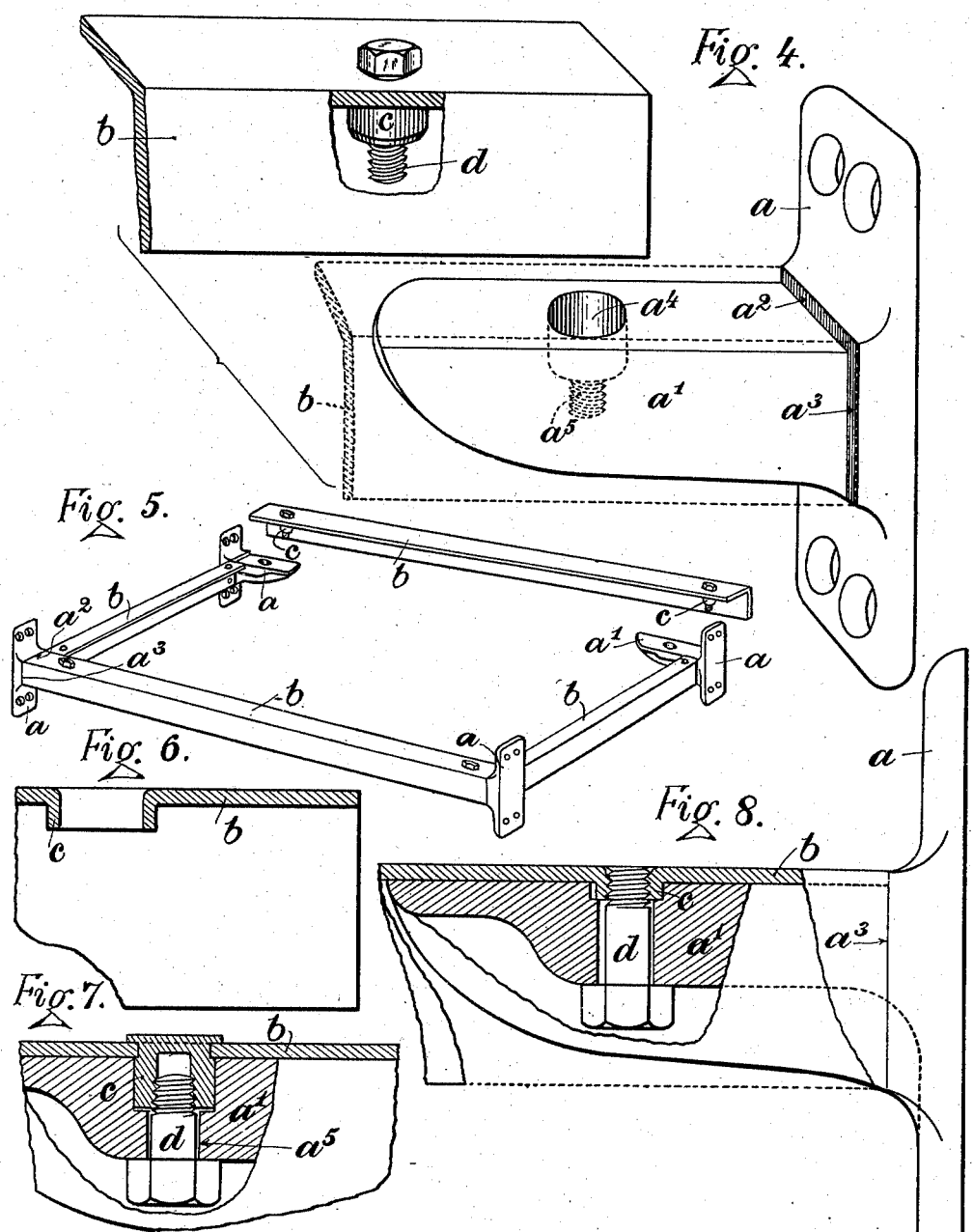

ERNEST VAUGHAN, OF DUDLEY PORT, TIPTON, ENGLAND.

CONNECTION-FITTING FOR BEDSTEADS.

965,769.  Specification of Letters Patent.  Patented July 26, 1910.

Application filed December 11, 1909. Serial No. 532,598.

*To all whom it may concern:*

Be it known that I, ERNEST VAUGHAN, subject of the King of Great Britain, residing at Dudley Port, Tipton, in the county of Stafford, England, have invented certain new and useful Improvements in Connection-Fittings of Bedsteads, of which the following is a specification.

This invention relates to the junction fittings used in the construction of bedsteads and cots for the purpose of connecting or attaching the metallic angle-iron sides to the end rails or pillars.

The invention is more particularly applicable to the composite type of bedsteads in which wooden head and foot rails, or wooden corner pillars, are used in combination with metallic side members, although the invention is also applicable to ordinary metallic bedsteads and cots.

The connection or junction fittings to which the invention is applicable are of that type in which the plain ends of the angle-iron side members seat themselves upon correspondingly shaped cantaliver brackets secured to the corner pillars or ends, being secured in position thereon by bolts, screws, or the like.

The principal object of the present invention is to provide improved and simplified means for effecting the connection of the side members to the brackets by which greater rigidity and strength is secured.

Figure 1 of the accompanying drawings represents a part longitudinal section, through a corner attachment fitting for composite bedsteads constructed in accordance with this invention, the angle-iron side member being shown attached. Fig. 2 is a part sectional view showing said side member detached from the corner bracket. Fig. 3 shows a transverse cross-section through the fitting. Fig. 4 is a perspective view of the side member and bracket disconnected from one another. Fig. 5 represents a perspective view of a frame, for a composite bedstead, in which corner attachment fittings are employed constructed in accordance with this invention, one of the side members being shown detached. Fig. 6 shows a modified method of forming the hereinafter described bush or dowel on the angle-iron side member. Fig. 7 represents, in section, a modified method of connecting the side member to the corner bracket. Fig. 8 shows a similar method of connecting the angle-irons as in Fig. 7, but with the bush formed as in Fig. 6.

The same letters of reference indicate corresponding parts in each of the figures of the drawings.

Referring to Figs. 1 to 5 of the drawings, the corner pillar brackets each comprise an attachment plate $a$ adapted to be screwed or bolted to the face of a wooden pillar or the like, and a cantaliver-like part $a^1$ which is cast or formed in a piece with the attachment plate and projects at right angles therefrom. This cantaliver portion of the bracket is shaped on its top and outer side so that it conforms in contour to the inside of the angle-iron side member $b$ which takes a close and extended seating thereon, the horizontal portion of said angle-iron seating itself closely upon the flat top of the bracket, and the vertical portion fitting closely against the flat outer side thereof. To further insure lateral rigidity, at the junction of the cantaliver portion $a^1$ with the attachment plate $a$, straight edged shoulders $a^2$, $a^3$, are formed which extend across the flat top and also down the flat side of the said cantaliver, and constitute extended abutments against which the corresponding straight edges at the ends of the horizontal and vertical webs of the angle-iron $b$ take a close bearing when the side member is positioned on the bracket, as shown. The lateral rigidity of the angle-iron is further insured by providing the horizontal web of the angle-iron with an inwardly projecting bush $c$, which is arranged to engage within a depression or sinking $a^4$ formed in the cantaliver bracket $a^1$, said bush serving as a dowel or register for the two parts. Through the bush or dowel $c$ a bolt $d$ passes, whose lower end extends below said bush, and engages with a tapped hole $a^5$ at the bottom of the sinking $a^4$ in the bracket $a^1$.

To prevent the inadvertent detachment of the connecting screw $d$ from the angle-iron, a portion of the shank of said screw is formed plain at $d^1$, and of rather less diameter than the threaded part at its lower end. The upper end of the bush is made of less diameter than the lower end and is internally threaded, as at $c^1$, to allow of the lower end of the bolt being screwed therethrough. When said bolt is screwed into the hole $a^5$ in the bracket the plain part of the shank lies partly within the lower enlarged end of the bush as shown in Fig. 1, but when unscrewed, the plain shank may have a certain amount of play within the wormed hole $c^1$, and the enlarged screw end of the bolt serves as a stop and prevents the withdrawal of said bolt other than by screwing the said enlarged end out of the bush.

If it is desired to permanently connect the attachment screw $d$ to the angle-iron end, this may be done by closing or gathering in the threaded end or top of the bush $c$ after the screw has been applied by screwing the threaded portion thereof through the said top. The said contracted or gathered in part then provides a stop which prevents the screw from being detached from the angle iron but gives clearance to the plain part of the shank so as to admit of the engagement and disengagement of the end of the said screw with the tapped hole $a^5$ in the bracket. The closing or gathering in of the bush around the screw may be effected prior to or after the riveting or attachment of the bush to the angle-iron.

In the construction of the framing shown in Fig. 5, the end bars $b$ may be connected at their opposite ends to the brackets by casting them thereon or by other suitable means.

Instead of the bushes $c$ being separately attached to the angle iron side members $b$, as shown in Figs. 1 to 5, they may be formed directly out of said angle iron as shown in Fig. 6, this being effected by drawing processes.

In the modification shown in Fig. 7, the screw or bolt $d$ is passed through a hole $a^5$ in the bracket $a^1$ from the underside of the latter, and engages with an internally threaded bush $c$ carried by the angle iron $b$.

In the arrangement shown in Fig. 8 the bolt $d$ is passed through from the underside as in Fig. 7, and screws into a bush $c$ formed directly out of the angle-iron as in Fig. 6.

Having fully described my invention, what I desire to claim and secure by Letters Patent is:—

1. A connection fitting for bedsteads comprising a cantaliver bracket upon which the plain end of the angle iron side member seats itself, the said bracket and plain end forming companion elements, the bracket having a recess and having an opening coaxial with the recess and of smaller diameter than the same, a bush projecting from an inner face of the angle iron side member and arranged to engage in the recess, the bush providing an opening in the said member, and a bolt structurally independent of the bush and the bracket and having its shank passed through and movable axially of the bush, the recess and the opening in the bracket, the head of the bolt bearing against the face of one of the companion elements and the end portion of the bolt having threaded engagement in the opening of the other companion element.

2. A connection fitting for bedsteads comprising a cantaliver bracket upon which the plain end of the angle-iron side member seats itself, a tubular bush projecting from the inner face of the angle-iron, a recess in the bracket within which the bush engages, and a bolt passed through the bush and engaging with a wormed hole in the bracket, so as to connect the two parts of the fitting together.

3. A connection fitting for bedsteads comprising a cantaliver bracket upon which the plain end of the angle-iron side member seats itself, a tubular bush fitted in the angle-iron web and projecting from the inner face of same, said bush having an internally wormed upper end of less internal diameter than that of the lower end, a recess in the bracket within which the bush engages, and a bolt passed through the bush and engaging with a wormed hole in the bracket said bolt having a plain inner end of reduced diameter so that when same is unscrewed from the bracket it remains attached to the angle-iron until intentionally screwed out of the bush.

In testimony whereof I have hereunto set my hand in presence of two subscribing witnesses.

ERNEST VAUGHAN.

Witnesses:
HENRY SKERRETT,
HENRY NORTON SKERRETT.